United States Patent [19]
Ohba

[11] Patent Number: 5,708,648
[45] Date of Patent: Jan. 13, 1998

[54] OPTICAL HEAD APPARATUS INCLUDING LIGHT FOCUSING AND REFOCUSING LENS SYSTEMS

[75] Inventor: Akitomo Ohba, Tokyo, Japan

[73] Assignee: NEC Corporation, Japan

[21] Appl. No.: 651,300

[22] Filed: May 22, 1996

[30] Foreign Application Priority Data

May 31, 1995 [JP] Japan ................... 7-133979

[51] Int. Cl.[6] ........................... G11B 7/00
[52] U.S. Cl. ........................... 369/118; 369/112
[58] Field of Search ........................... 369/100, 109, 369/110, 112, 118, 44.24, 44.32

[56] References Cited

U.S. PATENT DOCUMENTS

| Re. 32,660 | 5/1988 | Lindow et al. | 369/44.24 X |
|---|---|---|---|
| 5,063,556 | 11/1991 | Chikuma | 369/112 |
| 5,153,873 | 10/1992 | Spruit et al. | 369/118 X |
| 5,195,081 | 3/1993 | Usui | 369/112 |
| 5,247,510 | 9/1993 | Lee et al. | 369/112 X |

FOREIGN PATENT DOCUMENTS

| 2-116032 | 4/1990 | Japan | G11B 7/13 |
|---|---|---|---|
| 0198038 | 8/1990 | Japan | 369/118 |
| 6-44605 | 2/1994 | Japan | G11B 7/135 |
| 6-84199 | 3/1994 | Japan | G11B 7/135 |

*Primary Examiner*—Paul W. Huber
*Attorney, Agent, or Firm*—Hayes, Soloway, Hennessey, Grossman & Hage, P.C.

[57] ABSTRACT

An optical head apparatus includes a light source, an objective lens, a beam splitter, a refocusing lens, a pinhole, and a photodetector. The objective lens and the beam splitter focus light emitted from the light source on an information recording medium. The objective lens, the beam splitter, and the refocusing lens refocus light reflected by the information recording medium and have a light-receiving numerical aperture which is larger than a light-focusing numerical aperture of the objective lens. The pinhole extracts only a central portion of light focused by the objective lens, the beam splitter, and the refocusing lens. The photodetector receives and detects light extracted by the pinhole.

10 Claims, 7 Drawing Sheets

OPTICAL HEAD APPARATUS INCLUDING LIGHT FOCUSING AND REFOCUSING LENS SYSTEMS

BACKGROUND OF THE INVENTION

The present invention relates to an optical head apparatus used in an information input/output system that performs recording and reproduction or only reproduction of information by using light.

In a conventional optical head apparatus, as the recording density of the information recording medium is increased, the size of a pit represented by a recording signal is decreased. Accordingly, the light spot that detects the pit must also be decreased.

As a technique for decreasing the light spot, a method of decreasing the focusing spot by increasing the numerical aperture of an objective lens is known. With this method, however, although the focusing spot can be decreased, the depth of focus is decreased accordingly, making it difficult to perform focus control. Also, the focusing characteristics are greatly degraded when light is incident obliquely on the information recording medium. More specifically, allowance against inclination of the information recording medium becomes small.

An optical head apparatus capable of increasing recording density while maintaining conventional focusing characteristics is also known. As a conventional optical head apparatus closely related to the present invention, one optical head apparatus is known in which the numerical aperture for focusing light on the information recording medium and the numerical aperture for receiving light reflected by the information recording medium are different. More specifically, the numerical aperture for focusing light is maintained at the conventional value and only the numerical aperture for receiving light is increased so as to be larger than that for focusing light. Conventional examples having this arrangement include one disclosed in Japanese Patent Laid-Open Nos. 2-116032, 6-84199, and others.

In general, as a lens has a Fourier transforming function, of light beams reflected by an information recording medium, a light beam in the vicinity of the optical axis of the objective lens represents a low spatial frequency component. The farther from the optical axis, the higher the spatial frequency component of the reflected light beam. In particular, when the reflected light beam is diffracted and scattered by a pit on the information recording medium, a high spatial frequency component is generated.

Figure 2:
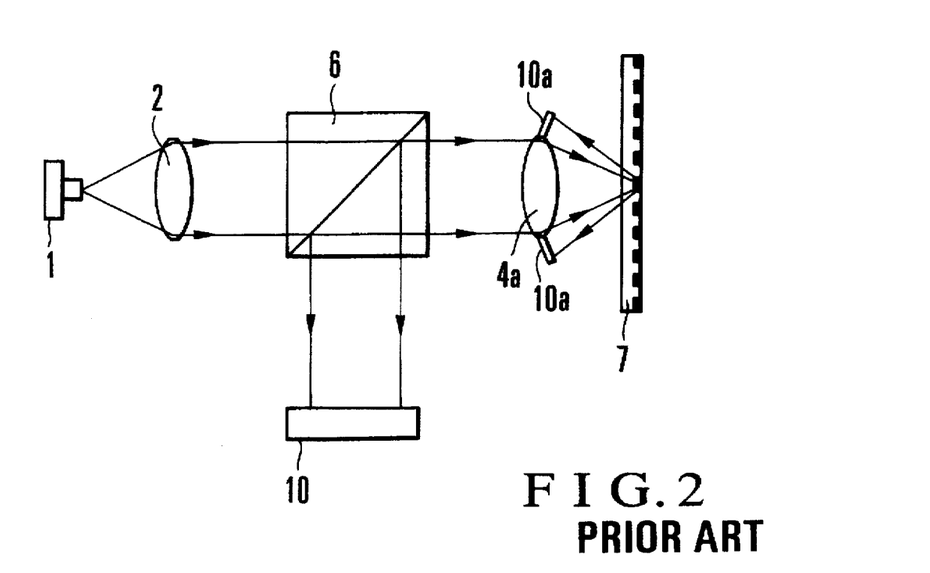
FIGS. 2 to 4 are views showing arrangements of optical systems having conventional optical head apparatuses.

In Japanese Patent Laid-Open No. 2-116032 presented above, the pseudo numerical aperture of an objective lens that receives light reflected by an information recording medium 7 is increased to improve the characteristics of the reproduction signal, as shown in FIG. 2. More specifically, a photodetector 10a is arranged outside an objective lens 4a to detect a light beam having a high spatial frequency component, thereby improving the MTF (Modulation Transfer Function) characteristics of the reproduction signal. Reference numeral 1 denotes a light source; 2, a collimator lens; 6, a beam splitter; and 10, a photodetector, respectively.

Figure 3:
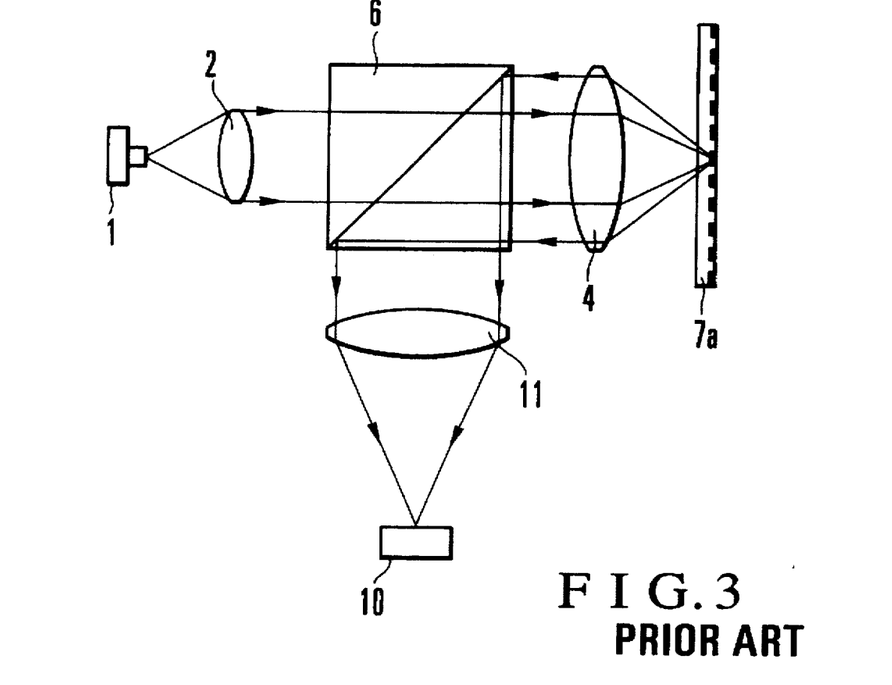

In Japanese Patent Laid-Open No. 6-84199 presented above, an objective lens 4 having a large numerical aperture is used, as shown in FIG. 3. In focusing light, a portion of the objective lens 4 near its center is used, and in receiving light, light is received by the objective lens 4 entirely, thereby improving the characteristics of the reproduction signal. In this case, an information recording medium 7a is made of a special reflecting film, the reflecting characteristics of which depend on the light intensity, so that the apparent size of the light spot is decreased. For this reason, the reflected light is scattered at a wider angle than an angle at which light is focused. Thus, the numerical aperture for receiving light is increased, thereby receiving reflected light without loss. Reference numeral 11 denotes a refocusing lens. Except for this, the arrangement of FIG. 3 is identical to that of FIG. 2.

Figure 4:
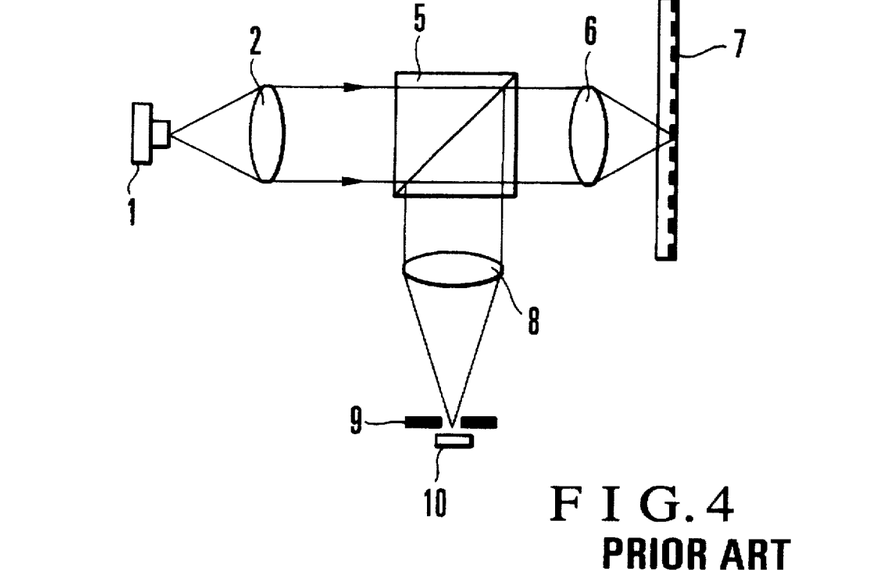

As another conventional optical head closely related to the present invention but different from the above apparatuses, one optical head apparatus having a cofocal optical system as shown in FIG. 4 is available. In this optical head, a pinhole 9 is arranged immediately before a photodetector 10 to detect the central portion of the beam. In this method, of a light spot focused on an information recording medium 7, light reflected by an irradiated pit which is not a reproduction target pit is shielded by the pinhole 9, thereby improving the reproduction resolution.

In the conventional optical head apparatuses, the numerical aperture for receiving light is increased, as described above, to improve the characteristics of the reproduction signal. However, as the numerical aperture for focusing light is small, the focusing spot remains large. Therefore, when pit size is decreased and a plurality of pits exist in a focusing spot, crosstalk occurs from pits around the read target pit, thereby degrading the signal characteristics. In another conventional optical head apparatus using a cofocal optical system, as the numerical aperture for focusing light and that for receiving light are the same, information read from a pit may be lost.

SUMMARY OF THE INVENTION

It is an object of the present invention to provide an optical head apparatus capable of reproducing a signal having high information recording density while maintaining conventional focusing characteristics.

In order to achieve the above object, according to the present invention, there is provided an optical head apparatus comprising a light source, a focusing lens system for focusing light emitted from the light source on an information recording medium, a refocusing lens system for refocusing light reflected by the information recording medium, the refocusing lens system having a light-receiving numerical aperture which is larger than a light-focusing numerical aperture of the focusing lens system, light-extracting means for extracting only a central portion of light focused by the refocusing lens system, and photodetecting means for receiving and detecting light extracted by the light-extracting means.

DESCRIPTION OF THE PREFERRED EMBODIMENTS

The preferred embodiments of the present invention will be described in detail with reference to the accompanying drawings.

Figure 1:
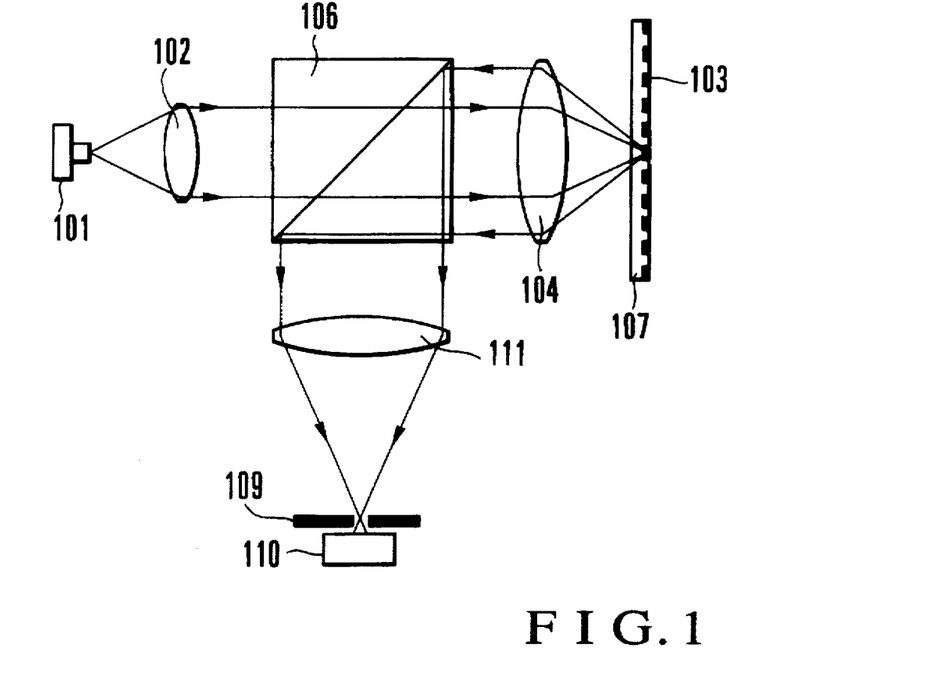
FIG. 1 is a view showing the arrangement of an optical system having an optical head apparatus according to the first embodiment of the present invention.

FIG. 1 shows the arrangement of an optical system having an optical head apparatus according to the first embodiment of the present invention. Referring to FIG. 1, reference numeral 101 denotes a light source; 102, a collimator lens; 103, a pit; 104, an objective lens; 106, a beam splitter; 109, a pinhole; 110, a photodetector; and 111, a refocusing lens. The light source 101 emits light. The collimator lens 102 converts light emerging from the light source 101 into parallel light. The pit 103 is recorded on an information recording medium 107. The objective lens 104 focuses light emitted from the light source 101 on the information recording medium 107. The beam splitter 106 transmits light from the collimator lens 102 to guide it to the objective lens 104, and reflects light reflected by the objective lens 104. The pinhole 109 extracts only the central portion of the light, and shields light reflected by pits other than a reproduction target pit. The photodetector 110 is arranged immediately after the pinhole 109 to detect light that has been reflected by the reproduction target pit and passed through the pinhole 109. The refocusing lens 111 focuses light reflected by the beam splitter 106 on the photodetector 110.

The operation of the optical head apparatus having the above arrangement will be described. Light emitted from the light source 101 passes through the collimator lens 102 and the beam splitter 106 and is focused on the information recording medium 107 by the objective lens 104. At this time, no problems arise even if the spot distribution of the focusing spots on the information recording medium 107 is larger than the pit 103. The objective lens 104 receives reflected light modulated by the pit 103 on the information recording medium 107, has a light-receiving numerical aperture larger than that for focusing light, and converts it into parallel light. As the objective lens 104, one having a aperture size larger than the diameter of the parallel light of the light emitted from the light source 101 is used, so that it can receive light scattered and reflected at a large angle due to diffraction of the pit 103. After the parallel light emerging from the objective lens 104 is reflected by the beam splitter 106, the light is focused by the refocusing lens 111, so that only the central portion of the light spot is passed through the pinhole 109 arranged at the focal position. Light that has passed through the pinhole 109 is received and detected by the photodetector 110.

When a light spot focused by the objective lens is irradiated onto a pit, in the manner as described above regarding the prior art technique, a high spatial frequency component is generated in light reflected by the pit due to diffraction scattering by the pit, so that the scattering angle of the light becomes larger than that obtained in focusing light. Thus, if the light-receiving numerical aperture for receiving light reflected by the information recording medium is equal to that for focusing light, as in the conventional optical head apparatus, pit information is partly lost, making it particularly difficult to correctly reproduce information from a pit which is smaller than the focused light spot. In this embodiment, the light-receiving numerical aperture is increased so as to be larger than the light-focusing numerical aperture, thereby preventing missing of a high spatial frequency component. When, however, the pit is small when compared to the light spot and a plurality of pits exist in the light spot, the reproduction signal is degraded by crosstalk caused by pits other than a read target pit. For this reason, in this embodiment, a cofocal optical system is employed in order to remove this crosstalk, and the pinhole 109 is thus used. Since the light-receiving numerical aperture is large, when the return light is focused by the refocusing lens 111, the state of the light upon reflection by the pit of the information recording medium 107 is restored at the focusing point. Therefore, when only light from the read target pit 103 is passed through the pinhole 109, the signal can be reproduced correctly. More specifically, in this embodiment, the two types of conventional optical head apparatuses described regarding the prior art technique are complemented by each other to enable an increase in recording density of the information recording medium.

Figure 5:
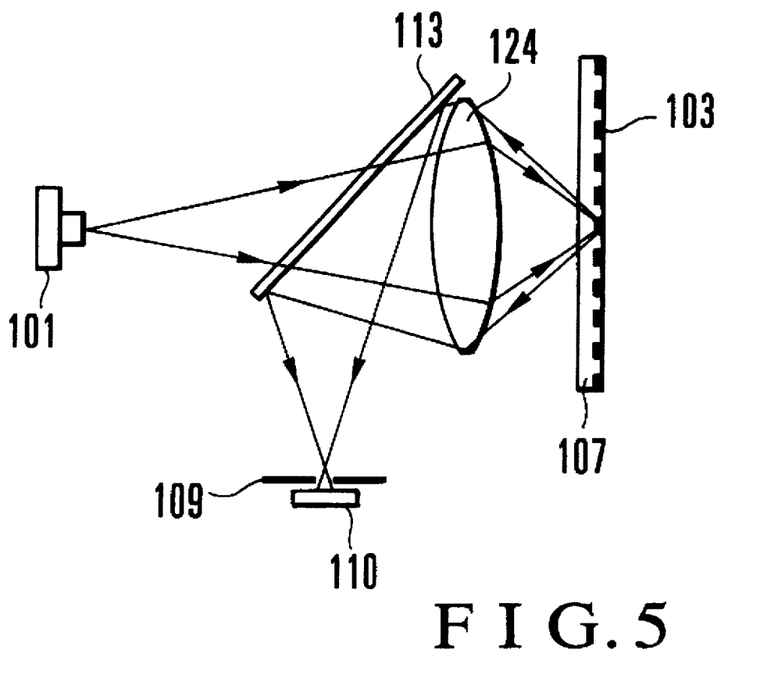
FIG. 5 is a view showing the arrangement of an optical system having an optical head apparatus according to the second embodiment of the present invention.

FIG. 5 shows the arrangement of an optical system having an optical head apparatus according to the second embodiment of the present invention. In this embodiment, a finite type objective lens 124 is used in place of the objective lens 104 shown in FIG. 1. Reference numeral 113 denotes a beam splitter. A collimator lens is omitted. Except for this, the arrangement of FIG. 5 is identical to that of FIG. 1, and a detailed description thereof will be omitted.

Figure 6A:
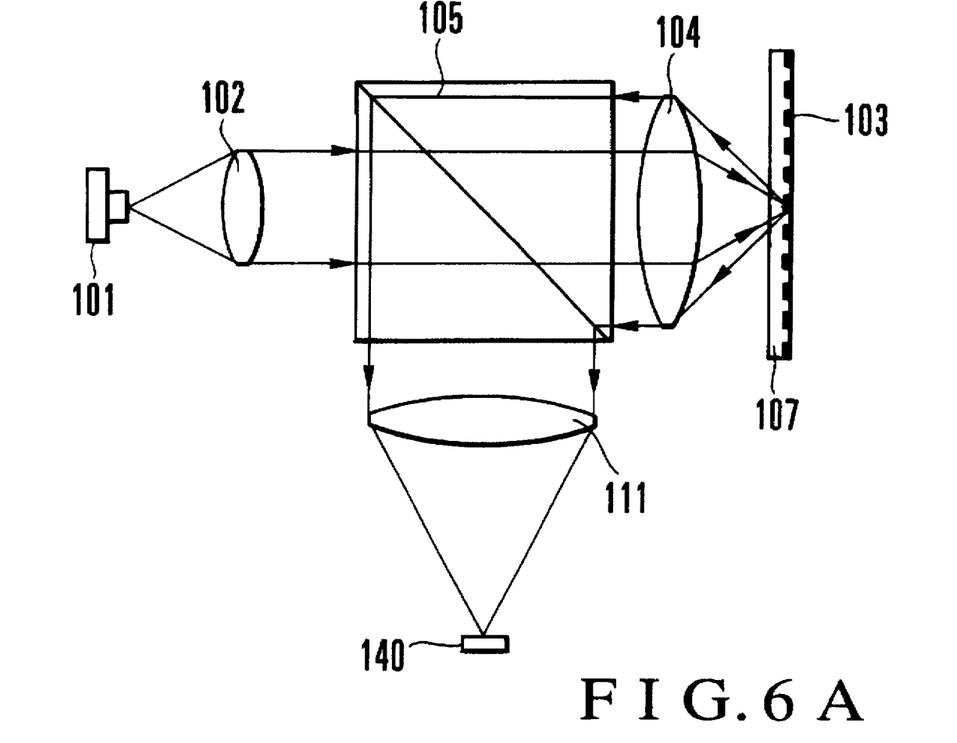
FIG. 6A is a view showing the arrangement of an optical system having an optical head apparatus according to the third embodiment of the present invention.
Figure 6B:
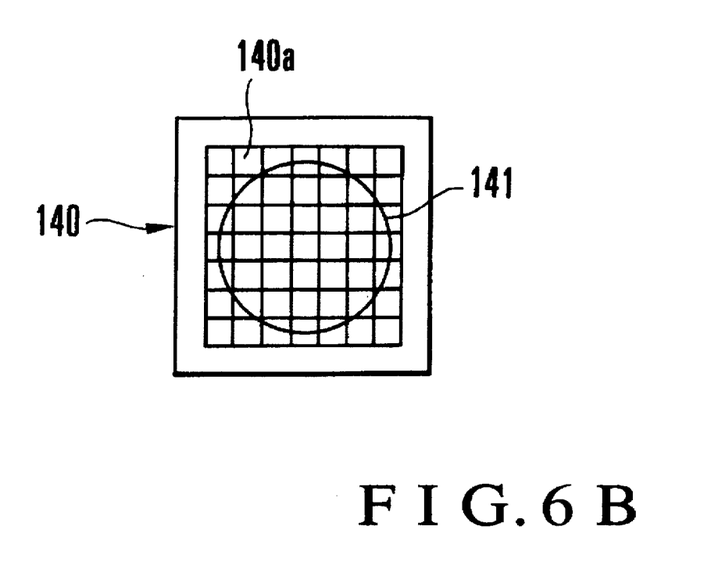
FIG. 6B is a plan view of a multi-division photodetector shown in FIG. 6A.

FIG. 6A shows the arrangement of an optical system as an optical head apparatus according to the third embodiment of the present invention, and FIG. 6B shows a multi-division photodetector shown in FIG. 6A. In the third embodiment, a light spot is focused on an information recording medium 107 to include a plurality of pits 103. As shown in FIG. 6B, return light 141 is received by a multi-division photodetector 140 and light beams reflected by the respective pits 103 are detected by a plurality of detection elements 140a divided in X- and Y-axis directions. Thus, the plurality of pits 103 can be reproduced simultaneously by the plurality of detection elements 140a.

In the first to third embodiments described above, as the information recording medium 107, an information recording medium recorded with pits for modulating the light intensity and pits for modulating the inclination of the plane of polarization of light, in addition to pits for modulating the phase, can be employed. More specifically, a recording/reproducing phase change medium, magneto-optical medium, and the like can be exemplified as such an information recording medium.

Embodiments obtained by further improving the above embodiments will be described.

With an information recording medium, e.g., a compact disk, formed with pits made of recesses and projections to modulate the phase of a signal, light irradiated on the pit portion is diffracted and scattered as its phase is modulated. Light reflected by such an information recording medium is scattered outside the aperture of the objective lens to reduce the quantity of return light to the signal system as compared to the quantity of return light reflected by an information recording medium having no pits. A reproduction signal is read from the information recording medium by utilizing this change in quantity of light. When, however, the light-receiving numerical aperture of the objective lens is increased, as in the first and second embodiments, although a light spot identical to that on the information recording medium after modulation is restored before passing the pinhole, a change in quantity of return light is decreased, thereby decreasing the amplitude of the reproduction signal.

Figure 7:
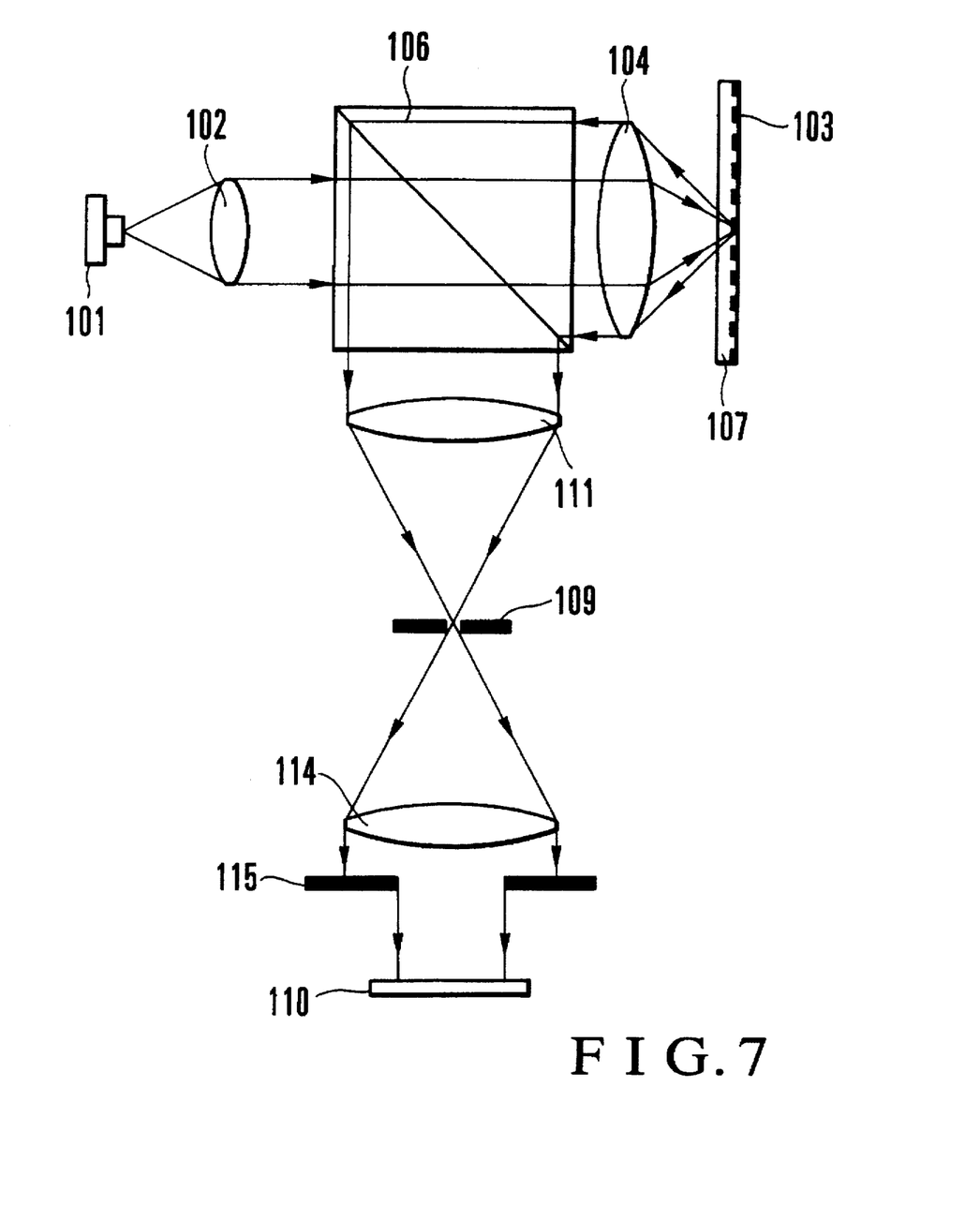
FIG. 7 is a view showing the arrangement of an optical system having an optical head apparatus according to the fourth embodiment of the present invention.

FIG. 7 shows the arrangement of an optical system as an optical head apparatus according to the fourth embodiment of the present invention. In this embodiment, a photodetector 110 is arranged remote from a pinhole 109. Light that has passed through the pinhole 109 is diffracted and scattered again, is received by a detection lens 114 to be converted into parallel light, and is made incident on the photodetector 110 while being subjected to aperture control with a predetermined aperture 115 arranged in the parallel light. When the size of a pit is smaller than the diameter of the light spot on the compact disk, light reflected by the periphery of the pit is suppressed, and only reflected light corresponding to the pit portion can be extracted through the aperture 115. As a result, since an amount of reflected light received by the photodetector 110 changes greatly depending on the presence/absence of a pit, a decrease in amplitude of the reproduction signal can be suppressed.

Figure 8:
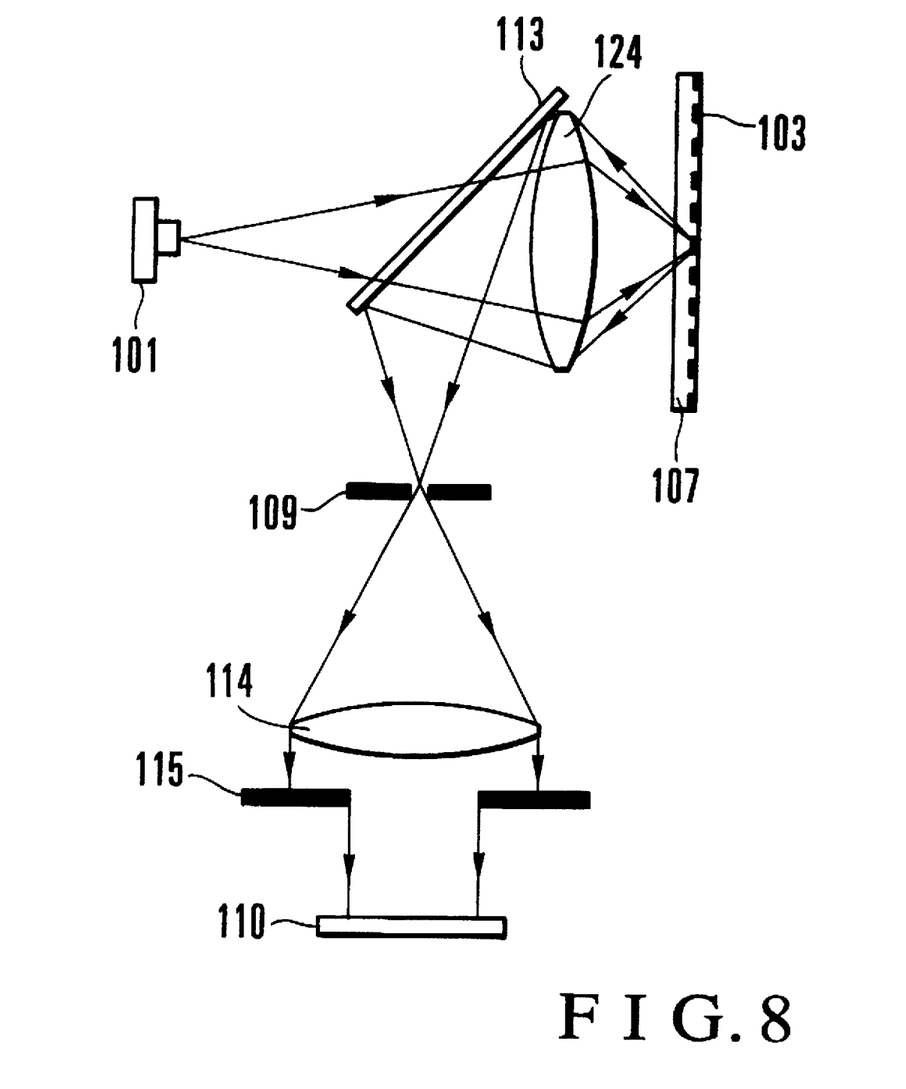
FIG. 8 is a view showing the arrangement of an optical system having an optical head apparatus according to the fifth embodiment of the present invention.

FIG. 8 shows the arrangement of an optical system as an optical head apparatus according to the fifth embodiment of the present invention. In this embodiment, a detection lens 114 and an aperture 115 identical to those shown in FIG. 7 are added to the second embodiment shown in FIG. 5. Thus, even if an information recording medium 107 is a phase modulation medium, the amplitude of a reproduction signal will not be decreased.

Figure 9:
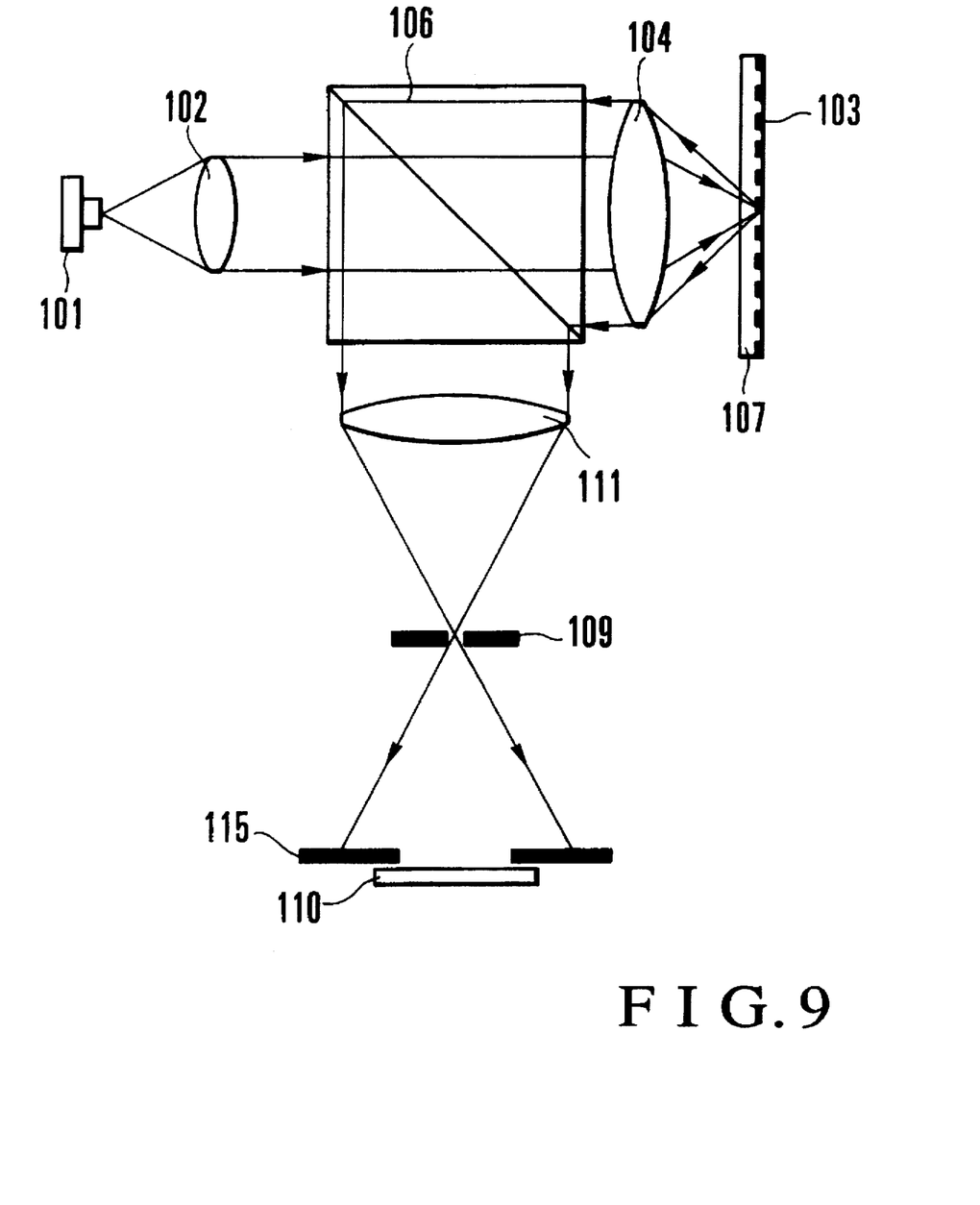
FIG. 9 is a view showing the arrangement of an optical system having an optical head apparatus according to the sixth embodiment of the present invention.

FIG. 9 shows the arrangement of an optical system as an optical head apparatus according to the sixth embodiment of the present invention. In this embodiment, the detection lens 114 of the fourth embodiment shown in FIG. 7 is omitted, and an aperture 115 and a photodetector 110 are directly arranged in scattered light that has passed through a pinhole 109. The photodetector 110 is arranged immediately after the aperture 115. In this embodiment, the same effect as that of the fourth embodiment can be expected. The arrangement in which a detection lens is omitted and an aperture and a photodetector are provided directly may also be applied to the fifth embodiment shown in FIG. 8.

The fourth to sixth embodiments described above are effective in suppression of a decrease in signal amplitude of a reproduction signal of mainly a phase modulation medium. However, signal detection is possible also from an information recording medium recorded with pits for modulating a light intensity and pits for modulating the direction of the plane of polarization of light.

As has been described above, according to the present invention, by increasing in light-receiving numerical aperture, lost signal information caused in a conventional optical head apparatus is prevented, and by enlargement of the beam, crosstalk caused in the use of the cofocal optical system is decreased. Also, the optical recording density of the information recording medium can be increased. As the light-focusing numerical aperture is equal to the conventional value, the adverse influence of the enlargement of the beam, which is caused by the inclination of an objective lens, an optical disk, or the like, can be suppressed in the same manner as in the conventional apparatus.

What is claimed is:

1. An optical head apparatus comprising:

a light source, a focusing lens system for focusing light emitted from said light source on an information recording medium, a refocusing lens system for refocusing light reflected by the information recording medium, said refocusing lens system having a light-receiving numerical aperture which is larger than a light-focusing numerical aperture of said focusing lens system, light-extracting means for extracting only a central portion of light focused by said refocusing lens system, and photodetecting means for receiving and detecting light extracted by said light-extracting means, said optical head apparatus further comprising aperture limiting means for shielding a peripheral portion of light that has passed through said light-extracting means and been diffracted and scattered, so that said photodetecting means receives and detects light that has passed through said aperture limiting means.

2. An apparatus according to claim 1, wherein said aperture limiting means comprises an aperture having a predetermined size and arranged between said photodetecting means and said light-extracting means that are provided separate from each other.

3. An apparatus according to claim 2, wherein said photodetecting means is arranged immediately after said aperture.

4. An apparatus according to claim 2, further comprising a detection lens for converting light that has passed through said light-extracting means into parallel light, so that said photodetecting means receives and detects only a central portion of parallel light emerging from said detection lens through said aperture.

5. An optical head apparatus comprising:

a light source, a focusing lens system for focusing light emitted from said light source on an information recording medium, a refocusing lens system for refocusing light reflected by the information recording medium, said refocusing lens system having a light-receiving numerical aperture which is larger than a light-focusing numerical aperture of said focusing lens system, a pinhole for extracting only a central portion of light focused by said refocusing lens system, and photodetecting means for receiving and detecting light extracted by said pinhole, said optical head apparatus further comprising aperture limiting means for shielding a peripheral portion of light that has passed through said pinhole and been diffracted and scattered, so that said photodetecting means receives and detects light that has passed through said aperture limiting means.

6. An apparatus according to claim 5, wherein said pinhole is arranged at a focal position of said refocusing lens system.

7. An apparatus according to claim 5, further comprising an aperture having a predetermined size and arranged between said photodetecting means and said pinhole, and being provided separate from said pinhole, said aperture being for shielding a peripheral portion of light that has passed through said pinhole and been diffracted and scattered, so that said photodetecting means receives and detects light that has passed through said aperture.

8. An apparatus according to claim 7, wherein said photodetecting means is arranged immediately after said aperture.

9. An apparatus according to claim 7, further comprising a detection lens for convening light that has passed through said pinhole into parallel light, so that said photodetecting means receives and detects only a central portion of parallel light emerging from said detection lens through said aperture.

10. An apparatus according to claim 5, wherein said photodetecting means comprises a multi-division photodetector having a matrix array of detector elements.

* * * * *

UNITED STATES PATENT AND TRADEMARK OFFICE
CERTIFICATE OF CORRECTION

PATENT NO.  : 5,708,648
DATED       : January 13, 1998
INVENTOR(S) : Akitomo Ohba It is certified that error appears in the above-identified patent and that said Letters Patent is hereby corrected as shown below:

Claim 9, Col. 6, line 58, "convening" should be --converting--.

Signed and Sealed this

Thirteenth Day of October 1998

Attest:

BRUCE LEHMAN

Attesting Officer

Commissioner of Patents and Trademarks